Aug. 12, 1952         L. McK. GLEN         2,606,738
SPHERICAL PLUG WITH RENEWABLE RING SEAT
Filed Oct. 11, 1946
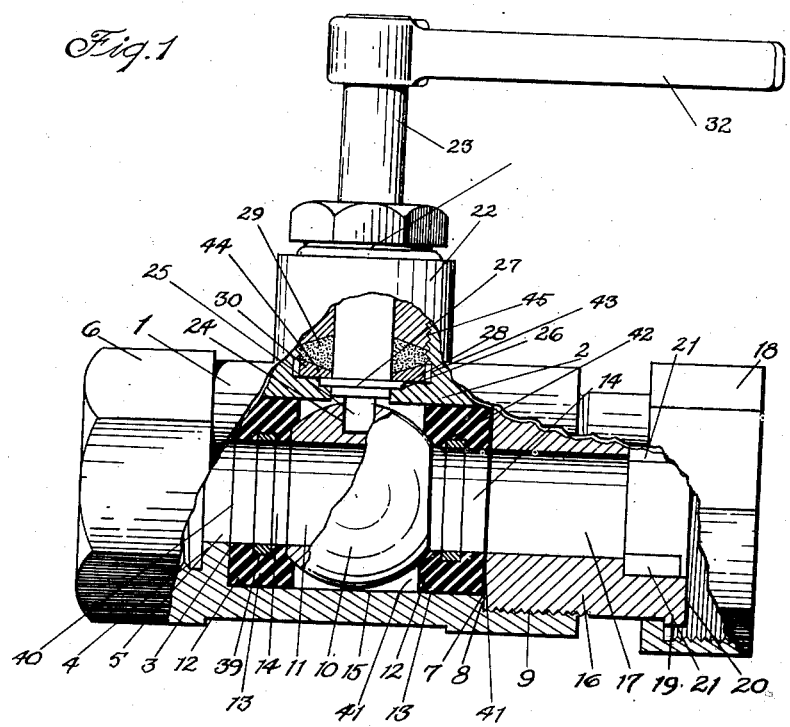
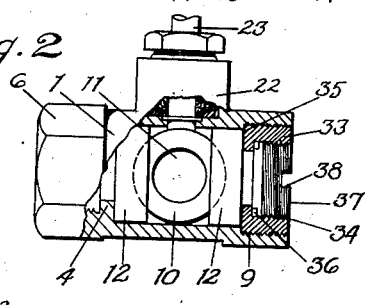
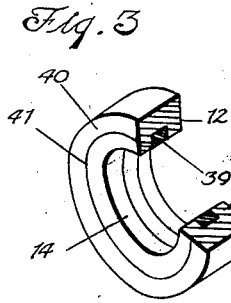
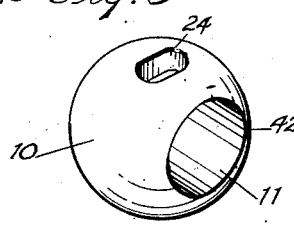
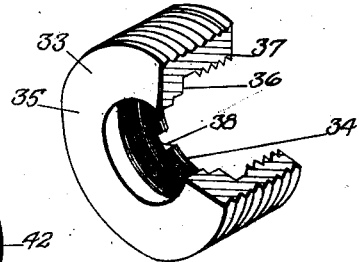
INVENTOR
Lauchlan M. Glen
BY
Francis E. Boyce
ATTORNEY Patented Aug. 12, 1952

2,606,738

UNITED STATES PATENT OFFICE 2,606,738

SPHERICAL PLUG WITH RENEWABLE RING SEAT

Lauchlan McKinnon Glen, Durban, Natal, Union of South Africa

Application October 11, 1946, Serial No. 702,856
In the Union of South Africa March 22, 1946

2 Claims. (Cl. 251—113)

This invention relates to cocks for controlling fluids having a plug of spherical shape seating between rings of rubber-like material.

The object of the invention is to provide a cock in which a spherical plug is held between a pair of resilient seatings which latter are given the maximum rigid support and in which they are subjected to the minimum of distortion during assembly or in operation. A further object is to form the body of the cock as a cylinder partially closed at one end and providing with its removable cover proper accommodation for the plug and its seats. A still further object is to shape the cock so that it forms a union connection in a pipe line.

The invention is illustrated in the accompanying drawings in which:

Fig. 1 is a side elevation of the cock partly in section, and

Fig. 2 is a modification of the cock shown in Fig. 1 on a reduced scale, and

Figs. 3, 4, and 5 are details.

According to this invention and referring firstly to Fig. 1 the cock comprises a body 1 bored to provide a cylinder 2 with a parallel bore. At one end 3 the cylinder 2 is partially closed by a disc-like structure 4 bored with a central opening 5 equal in diameter to the normal bore of the cock. On the other side of 4 the cylinder 2 is internally threaded to fit the pipe line in which the cock is to be used. Externally the body 1 may be provided with a standard sized hexagon 6 to hold the cock when screwing it in place. Towards the opposite end the cylinder 2 is open and may be suitably shaped to connect the cock to the pipe line. Preferably and as shown the cylinder 2 at 7 is counterbored to provide a shoulder 8 and beyond the shoulder an internal thread 9.

The plug 10 of the cock is a sphere with a diametrical bore 11 equal to 5 (that is, equal in diameter to the normal bore of the cock). The diameter of the sphere is slightly smaller than the bore of the cylinder 2 so that it can be freely rotated therein. The seatings for this plug 10 are two resilient rings 12 of rubber or rubber-like material. The outside diameter of rings 12 equals the bore of the cylinder 2 so that they can slide therein and sandwich plug 10 between them. The rings 12 have a substantial thickness 13 as shown and their bore 14 is conventionally equal to 5. The thickness 13 is such that when the rings 12 are assembled on either side of the plug 10 the assemblage will have a length approximately equal to the distance from the inside surface of 4 to the shoulder 8. Into part 9 of the cylinder 2 is screwed a plug 16 having a bore 17 equal to 5, and carries a union nut 18 engaging the inside of a flange 19. The outside or opposite end of plug 16 plus the flange 19 provides the surfaces 20 to support the packing washer usually employed in making a union joint between face 20 and a cooperating face of a pipe line or the like. The bore 17 of plug 16 may be formed to provide a surface which may be gripped by a convenient tool. As shown in Fig. 1 two ribs 21 diagonally opposite one another are cast in the enlarged bore 17 allowing for the blade of any convenient tool to be inserted to rotate plug 16. With the plug 16 in place and screwed up to shoulder 8 the rings 12 and the sphere 10 are sandwiched together with the proper pressure, while removal of plug 16 from cylinder 2 allows the rings 12 and the sphere 10 to be withdrawn.

Externally the body 1 has a pap 22 accommodating a spindle 23. In the sphere 10 at right angles to the bore 11 a recess 24 is cut to accommodate the end 25 of the spindle 23. Said end 25 is shaped to engage the similarly shaped recess 24. Preferably the spindle end 25 has segments cut from opposite sides of its circular end to fit into the recess 24 shown in Fig. 5. At 26 the wall of the cylinder 2 is holed to allow the end 25 of the spindle 23 to project into the recess 24 in the sphere 10. 27 is a collar on spindle 23 which fits into a recess 28 and prevents the spindle 23 passing too far into the cylinder 2. 29 is packing for the spindle 23, 30 a washer which prevents the packing 29 from squeezing into the cylinder 2, and 31 a gland screwed into the end of pap 22 to form a bearing for spindle 23 and to compress and keep the packing 29 in place. 32 is a handle for turning the spindle 23 the end of the latter is shaped somewhat similar to its end 25 and onto this the boss of the handle 32 fits.

Fig. 2 shows an alternative and often preferred way of connecting the cock into the pipe line. Instead of the union nut 18 and flange 19 the plug 16 takes the form of a ferrule 33 (Fig. 4) screwed externally to fit the internal thread 9. Internally the ferrule 33 is threaded at 34 similar to the opposite end of cylinder 2 to fit the normal piping into which the cock is connected. The inside face 35 of the ferrule 33 butts against the shoulder 8 when it is screwed up into place and this end face is bored to the same diameter as 5. Inside and at the bottom of ferrule 33 two ribs 36 are cast not high enough to interfere with the threaded portion 34 nor wide enough to interfere with the bore 5. These ribs 36 are useful for allowing a chisel or other conveniently shaped tool to be used for unscrewing or screwing up ferrule 33. Alternately or in addition, the opposite end of ferrule 33 may have its face 37 nicked with grooves 38 to accommodate a suitable tool to carry out the screwing operation.

The resilient rings 12 may be reinforced with metal rings 39 let into a recess in their bore 14 and are flush therewith. To ensure a good abutting contact of the rings 12 their end faces 40 are adapted to be easily flattened against the face they are pressed against. To assemble the cock the cylinder 2, stripped of every fitting, has the first resilient washer 11 pushed up until it beds flat against the part 4 so that it bore 14 coincides with bore 5 of the cock. The plug 10 is now slipped into place so that its bore 11 coincides with the bore 14 of washer 12. The edges 42 of bore 11 in plug 10 are rounded off to prevent them cutting the washer 12. The recess 24 in plug 10 coincides with the opening 26 for the end 25 of the spindle 23. Next the second ring 12 is put in place in cylinder 2 against the plug 10. The two rings 12 with the plug 10 sandwiched between them just fill the cylinder 2 up to the shoulder 8. The spindle 23 is now threaded with washer 30 its flat face 43 resting against the collar 27 and its cuplike face 44 towards the cuplike face 45 of gland 31. The spindle 23 is now threaded into the bore of pap 22 and its end 25 entered to engage the recess 24 in the sphere 10. Above washer 30 suitable packing material 29 is inserted and the gland 31 screwed up to compress it and hold spindle 23 rotatably and centrally in pap 22. The handle 32 is now placed on the projecting end of spindle 23. The plug 10 may be rotated to check that the assembly is in order. Then plug 16 is screwed up so that its end face butts against the shoulder 8 and the exposed face of ring 12 as shown in Figs. 1 or 2. The cock is now ready for use and to be inserted into the pipe line or other desired position. It should be noted that rings 12 are interchangeable and each face is similar so that they cannot be assembled wrongly in cylinder 2.

Heretofore in designs of cocks of this description the rubber rings 12 have been unsupported over large portions of their surfaces resulting in the resilient rubber tending to flow, when under pressure, into the unsupported areas. The result was unequal wear of the rings 12 resulting in the cock leaking. Again the plug 10 in previous designs was not spherical in that it had a proturberance where the spindle 23 engaged it and the rubber rings 12 would on occasions make contact therewith and be deformed.

In this invention, as already pointed out, the rings 12 are well supported so that they cannot be deformed under pressure, the only unsupported part being the portion of the front face out of contact with the plug 10. Said part is very small in area, in fact it is just a ring between the surface of the contacting plug 10 and the wall of the cylinder 2. At the same time the parts are of simple form, therefore easy to manufacture on a mass production basis.

The invention provides a cock which itself may form a union joint in a pipe line. Such provision is often of very great convenience when replacements have to be made. On the other hand as shown in Fig. 2 it may be connected into the pipe line in the usual way with the pressure of the line in the pipe line acting in either fluid carried in the pipe line acting in either direction. The cock itself is made from the assemblage of parts all of which can be produced by mass production methods and are interchangeable. The proper assembly of the parts provides a cock with the plug 10 properly seated and ready for use. In use there is practically no deformation of the rubber seats and consequently little, if any, wear.

It should be noted that the depth of the packing 29 may be limited to something less than the depth of the recess 24 so that the end 25 of the spindle 23 will be retained therein even if the packing 29 is removed. The recess 24 may have its long axis in any direction to the bore 11.

What I claim as new and desire to secure by Letters Patent is:

1. A fluid-controlling valve comprising a cylinder having means for attaching it to a pipe line, a pair of resilient interchangeable rings disposed in separate relation to each other within said cylinder thereby to form between them a valve-seating space, said cylinder having an inwardly extending flange against which one of said rings abuts, a tubular plug threaded into one end of the cylinder and having an inwardly extending flange abutting against the other resilient ring, a spherical ball plug disposed between said rings, the diameter of said ball plug and of the resilient rings being substantially equal to the internal diameter of the cylinder, said ball plug having a bore formed therethrough whereby when the ball is turned to bring said bore into alinement with the cylinder a continuous passage-way is formed through said cylinder, resilient rings and ball plug, and a rotatable spindle projecting radially through the wall of the cylinder and removably keyed to said ball plug for rotating said plug into valve opening and closing positions.

2. A fluid-controlling valve as set forth in claim 1, a gland mounting being provided in the wall of the cylinder for the passage of said rotatable spindle.

LAUCHLAN McKINNON GLEN.

REFERENCES CITED

The following references are of record in the file of this patent:

UNITED STATES PATENTS

| Number | Name | Date |
|---|---|---|
| 117,704 | Warren | Aug. 1, 1871 |
| 934,614 | Huxley | Sept. 21, 1909 |
| 1,330,429 | Campbell | Feb. 10, 1920 |
| 1,584,600 | Black | May 11, 1926 |
| 1,616,386 | O'Stroske | Feb. 1, 1927 |
| 1,670,691 | Riggin | May 22, 1928 |
| 1,954,013 | Miller | Apr. 10, 1934 |
| 1,973,418 | Sibley | Sept. 11, 1934 |
| 2,144,619 | Corley | Jan. 24, 1939 |
| 2,173,949 | Neveu | Sept. 26, 1939 |
| 2,201,895 | Glen | May 21, 1940 |
| 2,373,628 | Gleeson | Apr. 10, 1945 |

FOREIGN PATENTS

| Number | Country | Date |
|---|---|---|
| 460,042 | Great Britain | Jan. 20, 1937 |
| 682,227 | Germany | of 1939 |